United States Patent
Utsunomiya et al.

(10) Patent No.: US 7,236,782 B2
(45) Date of Patent: Jun. 26, 2007

(54) WIRELESS COMMUNICATION APPARATUS AND WIRELESS COMMUNICATION METHOD

(75) Inventors: Yoriko Utsunomiya, Tokyo (JP); Tomoko Adachi, Urayasu (JP); Masahiro Takagi, Tokyo (JP); Tetsu Nakajima, Yokohama (JP); Tomoya Tandai, Tokyo (JP); Yasuyuki Nishibayashi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 25 days.

(21) Appl. No.: 11/150,222

(22) Filed: Jun. 13, 2005

(65) Prior Publication Data

US 2005/0277411 A1   Dec. 15, 2005

(30) Foreign Application Priority Data

Jun. 14, 2004   (JP) ............................ 2004-175950

(51) Int. Cl.
   *H04B 1/16*   (2006.01)
   *H04Q 7/00*   (2006.01)
(52) U.S. Cl. .................... 455/434; 455/450; 455/451; 455/452.1; 455/452.2; 455/509; 370/329; 370/332; 370/348
(58) Field of Classification Search ................ 455/450, 455/509, 451, 452.1, 452.2; 370/329, 332, 370/348
   See application file for complete search history.

(56) References Cited

U.S. PATENT DOCUMENTS

| | | | |
|---|---|---|---|
| 6,011,786 A | * | 1/2000 | Dent ......................... 370/330 |
| 7,065,061 B1 | * | 6/2006 | Zellner et al. ............... 370/329 |
| 2003/0133469 A1 | | 7/2003 | Brockmann et al. |
| 2005/0277411 A1 | | 12/2005 | Utsunomiya et al. |

FOREIGN PATENT DOCUMENTS

| | | |
|---|---|---|
| EP | 1 553 730 A1 | 7/2005 |
| JP | 2003-87856 | 3/2003 |
| WO | WO 2004/036940 A1 | 4/2004 |
| WO | WO 2005/034435 A2 | 4/2005 |

OTHER PUBLICATIONS

U.S. Appl. No. 11/557,636, filed Nov. 8, 2006, Takagi et al.

* cited by examiner

*Primary Examiner*—William Trost
*Assistant Examiner*—Julio Perez
(74) *Attorney, Agent, or Firm*—Oblon, Spivak, McClelland, Maier & Neustadt, P.C.

(57) ABSTRACT

A wireless communication apparatus for performing wireless communication using at least one of the first channel having the first frequency band, and the second channel having the second frequency band which is wider than the first frequency band includes a channel search device which executes the first channel search for the bandwidth of the first frequency band and the second channel search for the bandwidth of the second frequency band, and obtains a search result indicating an idle channel, and a determination device which determines a channel to be used on the basis of the search result obtained by the channel search device.

14 Claims, 9 Drawing Sheets

WIRELESS COMMUNICATION APPARATUS AND WIRELESS COMMUNICATION METHOD

CROSS-REFERENCE TO RELATED APPLICATIONS

This application is based upon and claims the benefit of priority from prior Japanese Patent Application No. 2004-175950, filed Jun. 14, 2004, the entire contents of which are incorporated herein by reference.

BACKGROUND OF THE INVENTION

1. Field of the Invention

The present invention relates to wireless communication for performing media access control on the basis of carrier sense and, more particularly, to a wireless communication apparatus and wireless communication method for selecting a communication channel to be used on the basis of a channel search result, in a wireless communication system in which a plurality of users share a plurality of channels.

2. Description of the Related Art

Media access control (MAC) is control for causing a plurality of communication apparatuses which perform communication while sharing the same medium to decide how to use the medium in transmitting communication data. Owing to media access control, even if two or more communication apparatuses transmit communication data by using the same medium at the same time, there is less chance of the occurrence of a phenomenon (so-called collision) in which a communication apparatus on the receiving side cannot separate communication data. Media access control also reduces the chance of the occurrence of a phenomenon in which, despite the presence of communication apparatuses having transmission requests, a medium is not used by any of the communication apparatuses.

In wireless communication, since it is difficult for a communication apparatus to monitor transmission data while transmitting the data, media access control which is not premised on collision detection is required. IEEE 802.11, which is a typical technical standard for wireless LANs (Local Area Networks), uses CSMA/CA (Carrier Sense Multiple Access with Collision Avoidance).

According to CSMA/CA in IEEE 802.11, in the header of a MAC frame, a period (called a duration) until the end of a sequence comprising one or more frame exchanges following the MAC frame is set. In the duration, a communication apparatus which is irrelevant to the sequence and has no transmission right waits for transmission upon determining a virtual occupied status of the medium. This prevents the occurrence of collision. On the other hand, a communication apparatus which has a transmission right in this sequence recognizes that the medium is not used except for a period during which the medium is actually occupied.

IEEE 802.11 defines that the status of a medium is determined on the basis of a combination of virtual carrier sense on a MAC layer as in the former case and physical carrier sense on a physical layer as in the latter case, and media access control is performed on the basis of the determination.

Jpn. Pat. Appln. KOKAI Publication No. 2003-87856 discloses a method of realizing wireless base stations which can be commonly used in a plurality of wireless LAN schemes in a wireless communication system in which a plurality of wireless LAN schemes with different physical layers are present. More specifically, a wireless base station is made to alternately generate the first notification signal on the first physical layer and the second notification signal on the second physical layer and transmit them to wireless terminals, and the first and second physical layers are switched in synchronism with the first and second notification signals. The wireless terminal corresponding to the first physical layer is allowed access only for a predetermined period of time after the transmission time of the first notification signal, whereas the wireless terminal corresponding to the second physical layer is allowed access only for a predetermined period of time after the transmission time of the second notification signal.

IEEE 802.11 using CSMA/CA has made attempts to increase the communication speed mainly by changing the protocol on a physical layer. With regard to the 2.4 GHz band, there have been changes from IEEE 802.11 (established in 1997, communication speed=2 Mbps) to IEEE 802.11b (established in 1999, communication speed=11 Mbps), and further to IEEE 802.11g (established in 2003, communication speed=54 Mbps). With regard to the 5 GHZ band, only IEEE 802.11a (established in 1999, communication speed=54 Mbps) exists as standard specifications.

As an approach to increase communication speed, a method of extending the frequency bandwidth of a channel is available. In this method, a channel having a given bandwidth and another channel having a bandwidth which is wider than that of the above channel are present in a given frequency band.

In high-throughput communication, in order to secure an idle channel having a wide frequency band, a channel search must be performed according to a communication bandwidth. However, since the conventional channel search scheme is designed to perform the channel search by a given communication bandwidth. Therefore, a channel having a different communication bandwidth cannot be searched for by the conventional channel search scheme.

For example, according to the conventional channel search scheme, in a wireless communication system in which a plurality of users share a plurality of channels, an idle channel is searched for by always using a given communication bandwidth. In this channel search scheme, a terminal having transmission data sequentially checks whether each channel is idle, by always using the given communication bandwidth. As a result, if any idle channel is detected, the terminal transmits data on the detected idle channel after completion of all of the channel searches. More specifically, in a wireless LAN standard IEEE 802.11h, in order to dynamically select a channel, the channel search is performed by a given bandwidth before communication, and a channel to be used in communication is determined.

In the above-described conventional channel search scheme, an entire system always uses a given bandwidth without any change of the bandwidth used for searching for the channel. Hence, in the wireless communication system for performing communication using a plurality of communication bandwidths, in some cases, the communication bandwidth to be actually used for data transmission does not match the bandwidth to be used for the channel search. In such a case, in the conventional channel search scheme, the channel search cannot be effectively performed in correspondence with the plurality of communication bandwidths. Also, even upon performing the channel search, a desired communication bandwidth may not be secured.

BRIEF SUMMARY OF THE INVENTION

The present invention is directed to provide a wireless communication apparatus and wireless communication method for performing wireless communication by channel search for a plurality of channels having different frequency bands in the same frequency domain.

According to an aspect of the present invention, a wireless communication apparatus for performing wireless communication using at least one of a first channel having a first frequency band, and a second channel having a second frequency band which is wider than the first frequency band comprises, a channel search device configured to execute a first channel search for a bandwidth of the first frequency band and a second channel search for a bandwidth of the second frequency band, and obtain a search result indicating an idle channel, and a determination device configured to determine a channel to be used on the basis of the search result obtained by the channel search device.

DETAILED DESCRIPTION OF THE INVENTION

The embodiments of the present invention will be described with reference to accompanying drawing.

As a wireless communication system for performing a frequency channel search before communication, a wireless LAN system based on IEEE Std. 802.11-1999 (revision 2003 includes ISO/IEC 8802-11: 1999(E) ANSI/IEEE Std 802.11, 1999 edition, IEEE Std 802.11a-1999, IEEE Std 802.11b-1999, IEEE Std 802.11b-1999/Cor 1–2001, and IEEE Std 802.11d-2001) is available. The present invention applied to an IEEE 802.11 wireless LAN system will be exemplified below. An IEEE 802.11 standard is a standard pertaining to a physical (PHY) layer and a media access control (MAC) layer. The following embodiments will be described focusing attention on a process on the MAC layer. Note that the IEEE 802.11 standard includes a standard serving as an amendment or recommended practice of the IEEE 802.11 standard.

First Embodiment

Figure 1:
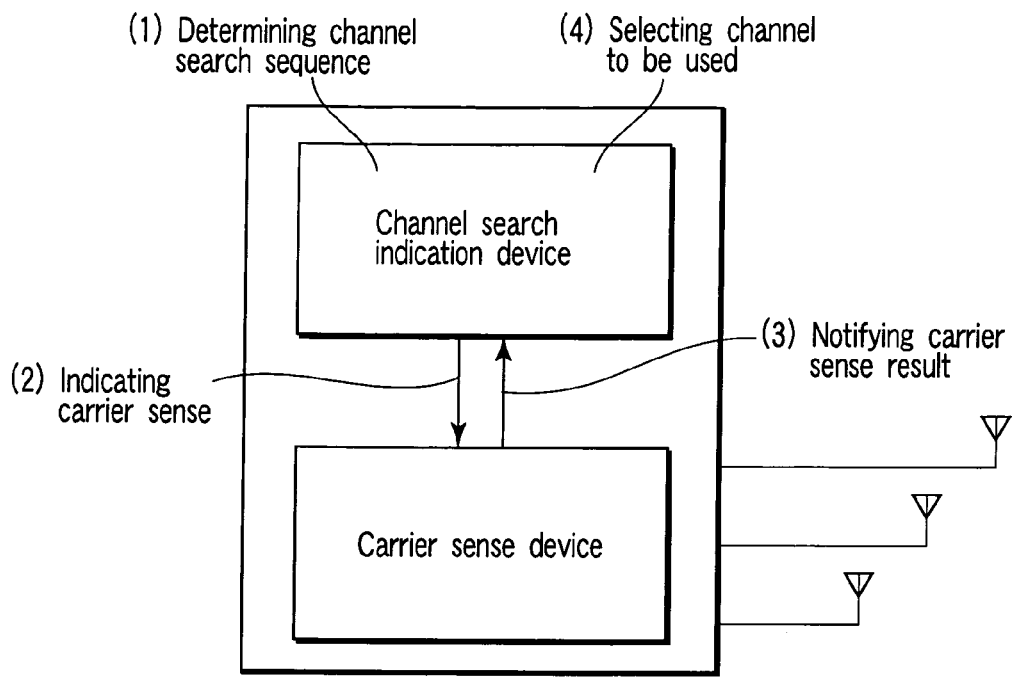
FIG. 1 is a block diagram showing an arrangement of a terminal according to the first embodiment of the present invention.

FIG. 1 is a block diagram showing a wireless communication apparatus according to the first embodiment of the present invention. As shown in FIG. 1, this wireless communication apparatus (to be referred to as a "terminal" hereinafter) is roughly comprised of a channel search indication device and a carrier sense device. In the channel search before communication, the channel search indication device in the terminal determines a communication bandwidth for performing the channel search, and a channel search sequence for determining the order of the channel searches (1). In accordance with the channel search sequence, the channel search indication device then indicates a carrier sense execution device to perform carrier sense such that channel carrier sense operations are sequentially executed (2). The carrier sense execution device performs physical carrier sense for a frequency channel having a indicated communication bandwidth, and notifies the channel search indication device of a carrier sense result which indicates that the channel is idle or busy (3). On the basis of the carrier sense result, the channel search indication device selects the channel to be used for communication.

Figure 2:
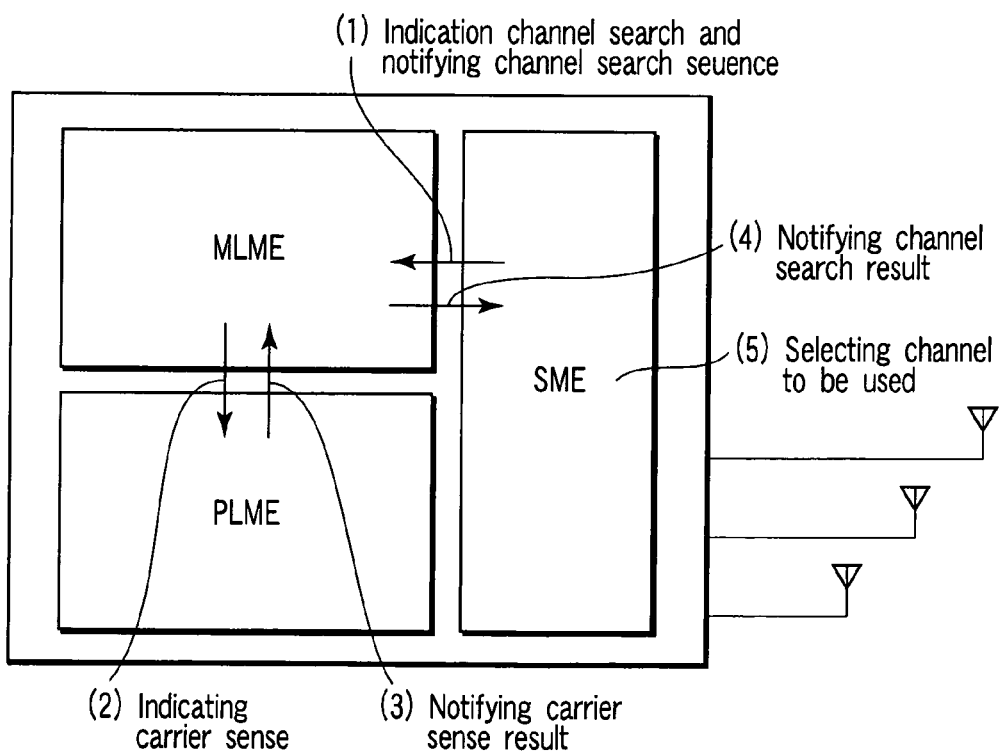
FIG. 2 is a block diagram showing an arrangement of a terminal according to an application to an IEEE 802.11 wireless LAN system.

FIG. 2 is a block diagram showing an arrangement of the terminal according to an application of an IEEE 802.11 wireless LAN system. As shown in FIG. 2, in the IEEE 802.11 wireless LAN system, the channel search indication device is set to a station management entity (SME) to perform carrier sense of the channel on a PHY layer. In the channel search, the SME indicates a MAC layer management entity (MLME) to perform the channel search (1). In this case, the MLME can be notified of the communication bandwidth used for the channel search, and the channel search sequence for determining the order of the channel searches, at the same time. In order to indicates to perform the channel search, for example, a scan request frame in the IEEE 802.11 wireless LAN system can be extended and used. In accordance with the channel search sequence indicated from the SME, the MLME notifies a PLME of the number of a channel to be searched for, and indicates to perform the physical carrier sense (2). The PHY layer management entity (PLME) performs physical carrier sense for the frequency channel having the indicated communication bandwidth, and notifies the MLME whether the channel is idle or busy (3). The MLME further notifies the SME of the channel search result (4), and the SME selects the channel to be used for communication (5).

The channel search sequence and the method of determining the channel to be used in the channel search indication device will be described below. Assume that the terminal supports both a communication protocol using a 20 MHz communication bandwidth and a communication protocol using a 40 MHz communication bandwidth, and secures two channels, i.e., one 40 MHz channel and one 20 MHz channel. In the channel search, the 20 MHz communication bandwidth and 40 MHz communication bandwidth are used. In the wireless communication system, four channels each having the 20 MHz communication bandwidth are assumed to be used.

Figure 3:
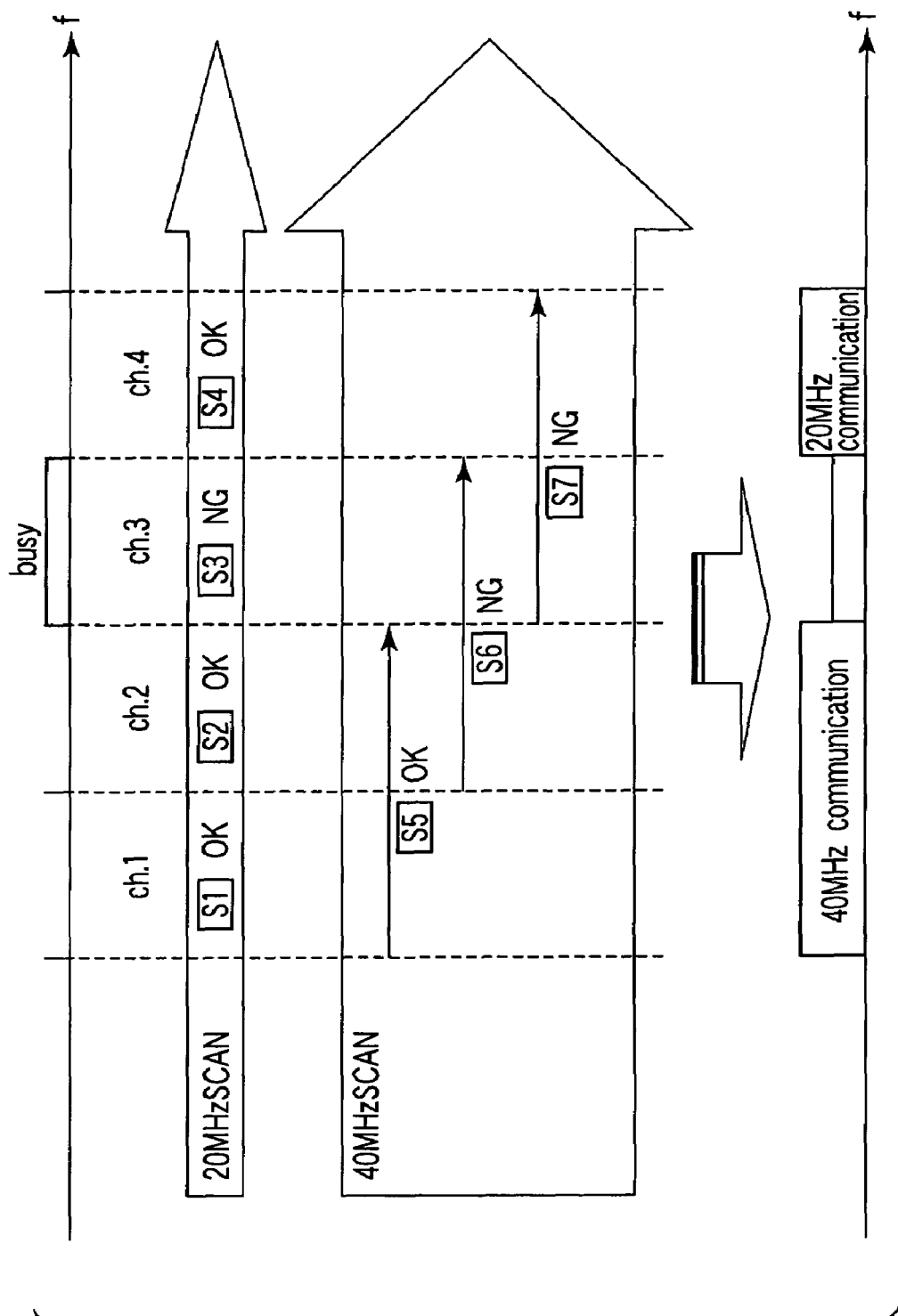
FIG. 3 is a view for explaining a channel search sequence according to the first embodiment.

FIG. 3 shows an example of the channel search sequence according to the first embodiment of the present invention. Ch1 to ch4 are sequentially searched for by using the 20 MHz communication bandwidth (searches S1 to S4 in FIG.

3). The carrier sense result indicates that ch3 is used by another terminal. Hence, ch1, ch2, and ch4 are recorded as the candidates of the 20 MHz channel to be used. After completion of the channel search by the 20 MHz communication bandwidth, the channels are sequentially searched for by the 40 MHz communication bandwidth (searches S5 to S7 in FIG. 3). As the result of the channel search by the 40 MHz communication bandwidth, since the idle status can be detected in only the 40 MHz channel in the search S5, ch1+2 is recorded as the candidate of the 40 MHz channel.

As described above, in FIG. 3, the channel search starts from a narrower communication bandwidth. In accordance with both the results of the channel searches by the 20 MHz and 40 MHz communication bandwidths, the channel search indication device determines to use ch1+2 as the 40 MHz channel, and use ch4 as the 20 MHz channel.

Figure 4:
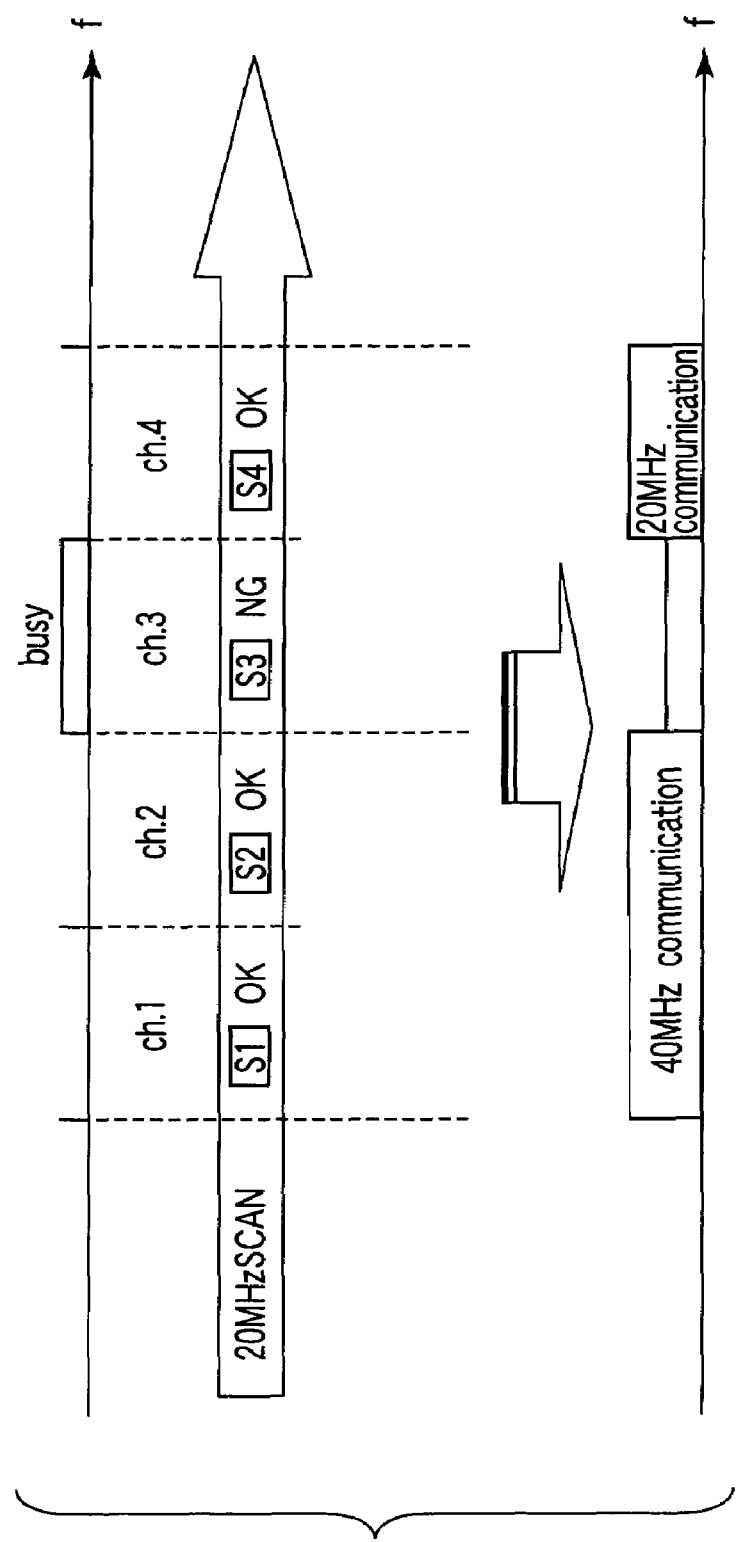
FIG. 4 is a view for explaining another channel search sequence according to the first embodiment.

FIG. 4 shows an example of another sequence of the channel search according to the first embodiment of the present invention. As shown in FIG. 3, the channel search shown in FIG. 4 starts from a channel having a narrower communication bandwidth. That is, after the channel search is performed by the 20 MHz communication bandwidth, the channel search by the 40 MHz communication bandwidth is performed. Note that the channel search sequence in FIG. 4 differs from that in FIG. 3 in that when two adjacent channels are idle as the result of the channel search by the 20 MHz communication bandwidth, these two adjacent channels are determined as a channel to be used in 40 MHz communication, and the channel search by the 40 MHz communication bandwidth is not performed.

Note that the channel search shown in FIG. 4 can be performed when the larger communication bandwidth is an integral multiple of the smaller one.

Also, in the channel search sequence shown in FIG. 4, the two 20 MHz channels used for securing the 40 MHz communication bandwidth may be adjacent to or separated from each other.

As described above, according to the first embodiment of the present invention, the arrangement for the channel search for the plurality of channels having different frequency bandwidths in the same frequency band can be realized. More specifically, since the channel search can be performed for the channels having different communication bandwidths, the channels having different communication bandwidths can be secured on the basis of the channel search result. Also, in accordance with the channel search result, the channel and communication bandwidth to be used can be selected appropriately.

Furthermore, since the following channel search is controlled in accordance with the channel search result, the efficiency of the search can be improved.

Second Embodiment

Figure 5:
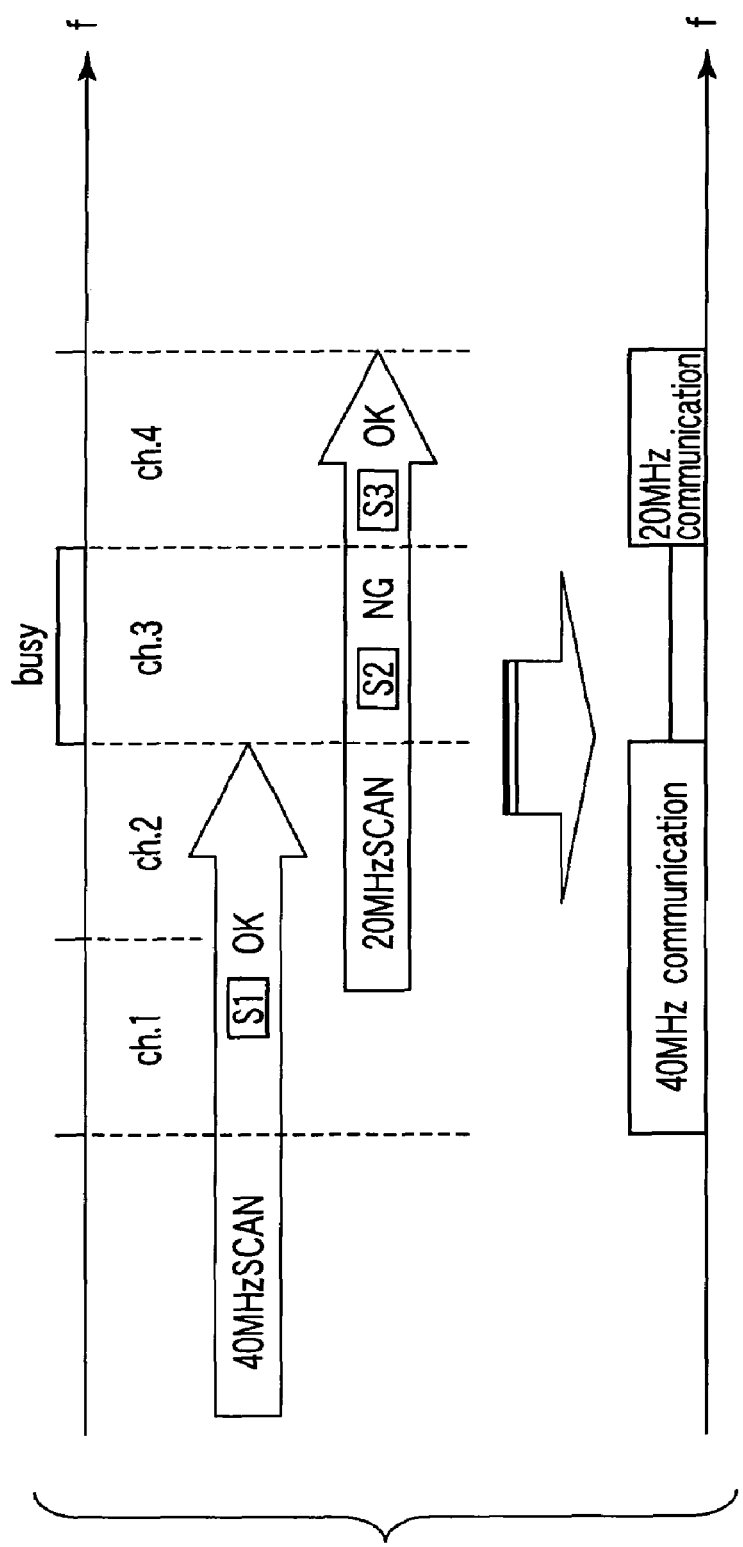
FIG. 5 is a view for explaining a channel search sequence according to the second embodiment of the present invention.

FIG. 5 shows an example of a channel search sequence according to the second embodiment of the present invention. The channel search sequence shown in FIG. 5 differs from that in the first embodiment in that the channel search by a 20 MHz communication bandwidth is performed after the channel search by a 40 MHz communication bandwidth has finished.

In a search S1 for the 40 MHz channel shown in FIG. 5, the carrier sense result indicates that a channel is not used by another terminal, i.e., the channel is idle. Hence, the channel search by the 40 MHz communication bandwidth is ended at the timing when the idle channel is found. A channel search indication device records the channel found in the search S1 shown in FIG. 5, as a channel to be used for 40 MHz communication.

Next, the channel searches by the 20 MHz communication bandwidth are sequentially performed for the frequency bands (ch3 and ch4, i.e., searches S2 and S3 in FIG. 3) other than the channel (channel found in the search S1 in FIG. 5) recorded as the 40 MHz channel. The result of the channel search by the 20 MHz communication bandwidth indicates that the idle status is detected in only ch4 in the search S3. Hence, ch4 is recorded as the candidate of the 20 MHz channel.

As described above, in the channel search shown in FIG. 5, rather than the first embodiment, the channel search starts from the larger communication bandwidth, and the channel search by the 20 MHz communication bandwidth is limitedly performed for remaining frequency bands which are not recorded as the channels having large communication bandwidths.

As the first embodiment, in accordance with the results of the channel searches by the 40 MHz communication bandwidth and the 20 MHz communication bandwidth, the channel search indication device determines that ch1+2 is used as the 40 MHz channel, and ch4 is used as the 20 MHz channel.

As described above, according to the second embodiment, the channel having the wider communication bandwidth for high-throughput communication can be secured as a priority, and the same effect as the first embodiment can be obtained.

Third Embodiment

The third embodiment of the present invention can be implemented in combination with the first embodiment. In the third embodiment of the present invention, when an idle channel is found in a channel search, a certain signal is transmitted to reserve the idle channel during the channel search period.

For example, in FIG. 3, during the channel search by a 20 MHz communication bandwidth, when a carrier sense result indicates that ch1 is an idle channel, a periodic signal (beacon signal or the like) is transmitted on ch1. That is, the signal is periodically transmitted on the found idle channel (ch1), during the period of carrier sense performed on ch2 to ch4 for the channel search by the 20 MHz communication bandwidth, or during the period of the channel search by the 40 MHz communication bandwidth.

According to this signal transmission, the reservation status of the idle channel can be obtained. Therefore, for example, one 20 MHz idle channel is reserved at the timing when it is found, and another 20 MHz channel can be searched for in the reservation status, in order to secure the 40 MHz communication bandwidth.

As a scheme of securing an idle channel till data transmission by using a certain signal during a channel search period, not only a scheme of periodically transmitting the signal on the idle channel as described above, but also a scheme of continuously outputting a signal such as a tone signal may be available. In this case, the signal continuously output on the idle channel may be, e.g., a low power signal in a wireless communication protocol format used in this system, or a signal in another system format. By using such a signal, the signal continuously transmitted to secure the channel interferes with another signal at a low possibility.

According to the third embodiment of the present invention, while securing the found channel, another channel can be searched. Therefore, a wide communication bandwidth of 40 MHz can be easily secured.

Fourth Embodiment

Figure 6:
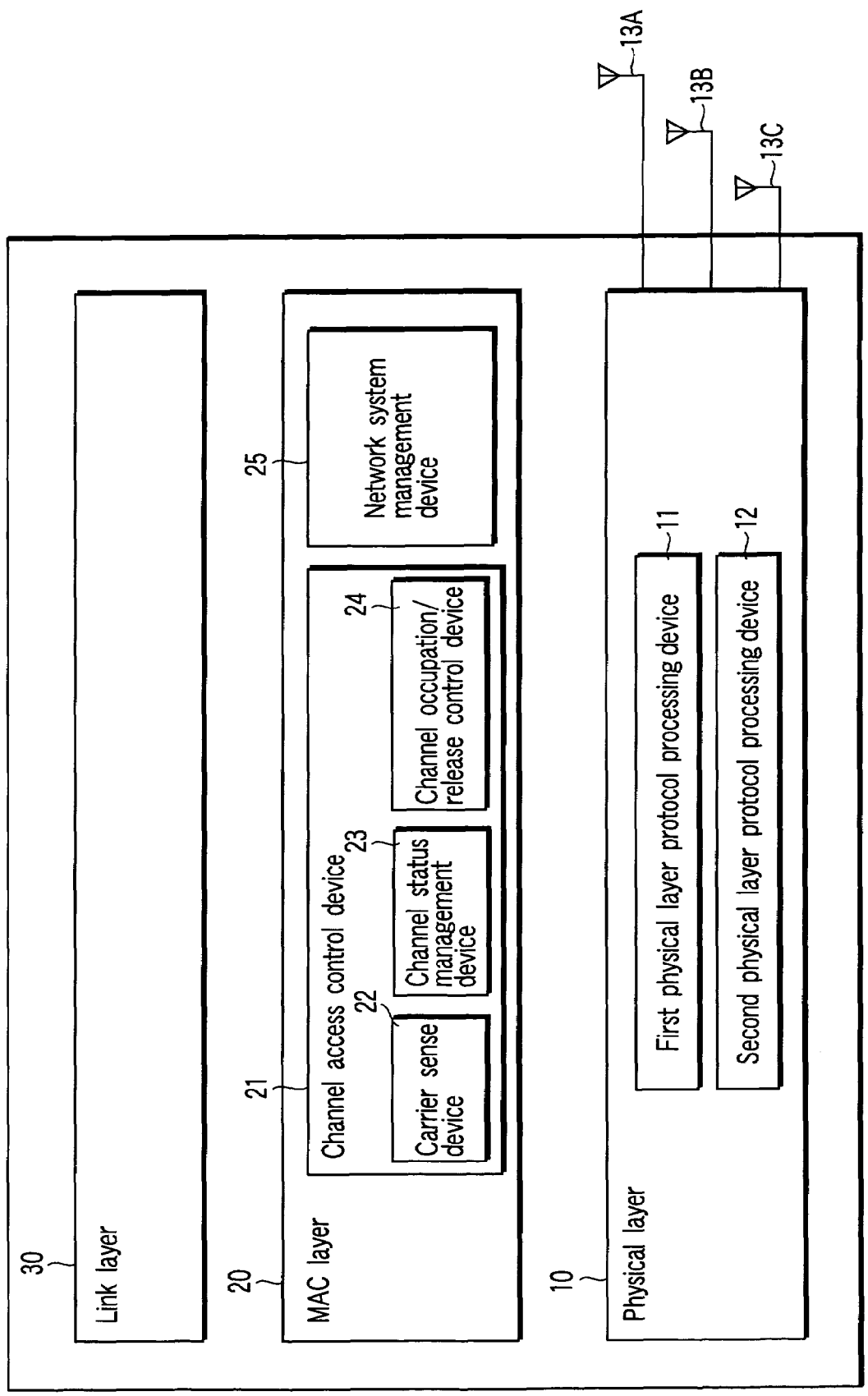
FIG. 6 is a block diagram showing an arrangement of a terminal according to the fourth embodiment of the present invention.

FIG. 6 shows an arrangement of a terminal according to the fourth embodiment of the present invention. As shown in FIG. 6, a wireless communication apparatus according to the fourth embodiment is roughly comprised of a physical layer 10, MAC layer 20, and link layer 30. Referring to FIG. 6, the physical layer 10 corresponds to two types of physical layer protocols using channels having different frequency bandwidths. More specifically, the physical layer 10 includes a first physical layer protocol processing device 11 which performs physical layer protocol processing for communication by using the first channel having the first frequency bandwidth, and a second physical layer protocol processing device 12 which performs physical layer protocol processing for communication by using the second channel having the second frequency bandwidth which is wider than the first frequency bandwidth. The first physical layer protocol processing device 11 and second physical layer protocol processing device 12 often share circuits and are not necessarily independent of each other in terms of implementation.

The protocols processed by the first physical layer protocol processing device 11 include, for example, at least a physical layer protocol defined by IEEE 802.11a. Assume that the first frequency bandwidth used by the first physical layer protocol processing device 11 is, e.g., 20 MHz. The first physical layer protocol processing device 11 may use a so-called MIMO (Multiple Input Multiple Output) technique using a plurality antennas on each of the transmitting side and the receiving side. Using the MIMO technique makes it possible to expect an increase in transmission capacity almost proportional to the number of antennas without changing the frequency band. It is therefore highly probable that this technique is adopted for IEEE 802.11 TGn (Task Group n) directed to a further increase in the throughput of IEEE 802.11.

Assume that the second physical layer protocol processing device 12 uses, for example, one or both of SISO (Single Input Single Output) and MIMO techniques. Assume that the second frequency band used by the second physical layer protocol processing device 12 has a bandwidth of, e.g., 40 MHz. The first frequency bandwidth exists in the second frequency bandwidth.

The MAC layer 20 includes a channel access control device 21. The channel access control device 21 includes a carrier sense device 22, channel status management device 23, and channel occupation/release control device 24. The MAC layer 20 further includes a network system management device 25. The network system management device 25 manages the generation of beacon frames, association, and the like, and is extended appropriately, as will be described later.

The carrier sense device 22 manages the idle/busy statuses of channels by managing carrier sense statuses on the basis of a combination of the real carrier sense information obtained from the physical layer 10 and the virtual carrier sense information obtained from a protocol at the MAC layer 20. That is, the carrier sense device 22 manages the idle/busy statuses of one or more first channels in the first frequency band and one or more second channels in the second frequency band instead of managing the idle/busy status of a single channel.

The channel occupation/release control device 24 generates a frame for controlling the virtual carrier sense status of the MAC layer 20, which is required to occupy a channel for a predetermined period of time or release an occupied channel. The frame generated by the channel occupation/release control device 24 is sent to the physical layer 10 and is transmitted by the first physical layer protocol processing device 11 and second physical layer protocol processing device 12.

The channel status management device 23 makes the carrier sense device 22, the channel occupation/release control device 24, and the first and second physical layer protocol processing devices 11 and 12 of the physical layer 10 operate in concert to perform desired channel access control.

Practical examples of the wireless communication apparatus shown in FIG. 6 include, for example, 40M/20M MIMO STA (AP) and 40M/20M STA (AP). 40M/20M MIMO STA (AP) is a terminal (or access point) which can perform SISO transmission/reception through a 20 MHz channel, MIMO transmission/reception through a 20 MHz channel, SISO transmission/reception through a 40 MHz channel, and MIMO transmission/reception through a 40 MHz channel. 40M/20M STA (AP) is a terminal (or access point) which can perform SISO transmission/reception through a 20 MHz channel and MIMO transmission/reception through a 40 MHz channel. Assume that the link layer 30 is provided with the function of a general link layer defined by IEEE 802.

Figure 7:
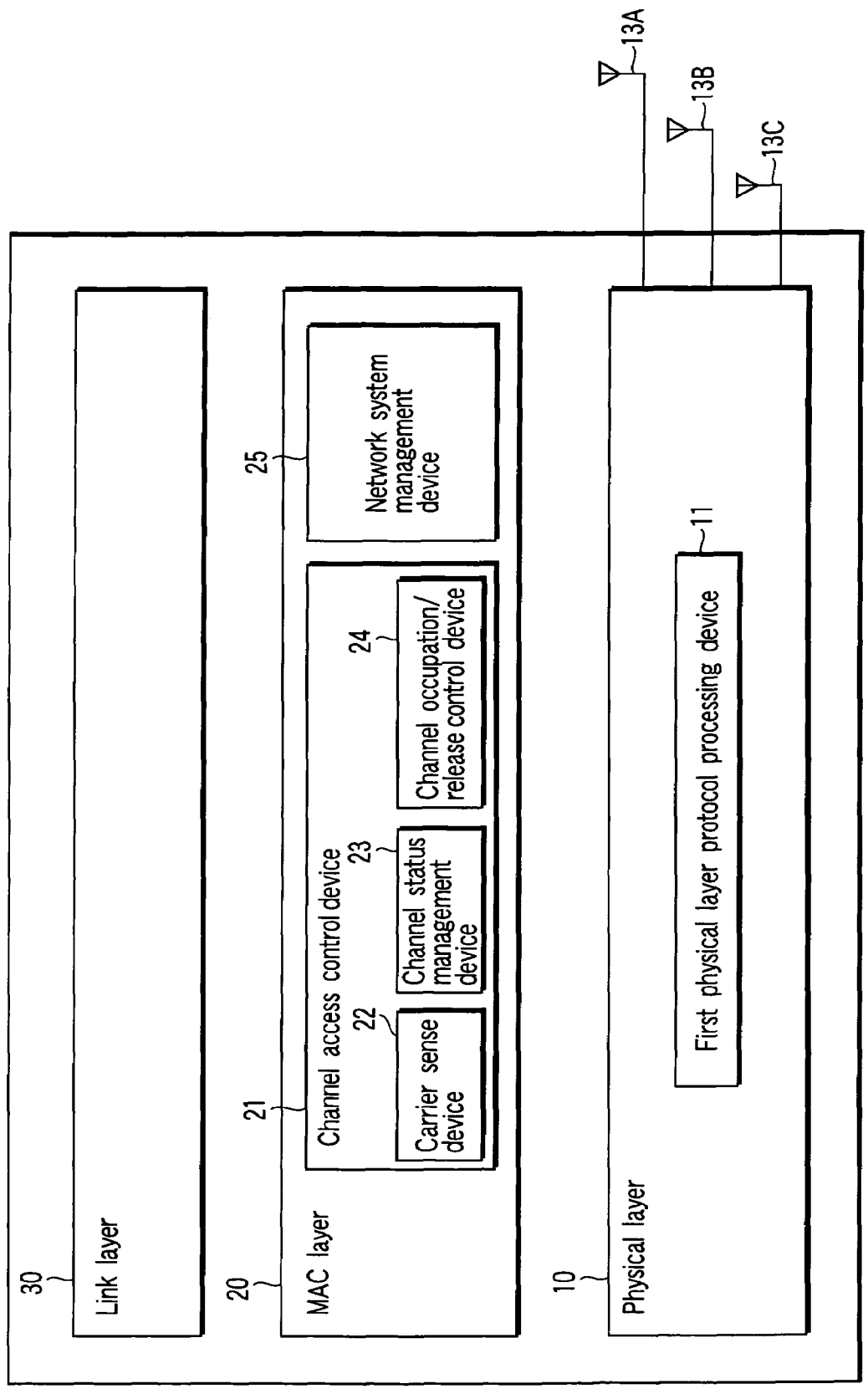
FIG. 7 is a block diagram showing an arrangement of another terminal according to the fourth embodiment.

Another wireless communication apparatus shown in FIG. 7 differs from the wireless communication apparatus shown in FIG. 6 in that the physical layer 10 does not include the second physical layer protocol processing device 12 shown in FIG. 6. This apparatus is the same as the wireless communication apparatus in FIG. 6 in that the first frequency band of the first physical layer protocol processing device 11 has a nominal bandwidth of 20 MHz and it makes no difference whether or not the MIMO technique is included. In addition, these apparatuses are the same in terms of the MAC layer 20 and link layer 30.

Note, however, that the wireless communication apparatus in FIG. 7 performs only media access control based on the first physical layer protocol processing device 11, and hence partly differs from the wireless communication apparatus shown in FIG. 6 in the details of the operation of the MAC layer 20 in FIG. 7. If the first physical layer protocol processing device 11 does not include the MIMO technique, the wireless communication apparatus in FIG. 7 may be an existing apparatus conforming to at least one of IEEE 802.11a, IEEE 802.11b, and IEEE 802.1g.

Practical examples of the wireless communication apparatus shown in FIG. 7 include, for example, 20M MIMO STA (AP) and 20M STA (AP). 20M MIMO STA (AP) is a terminal (or access point) which can perform SISO transmission/reception through a 20 MHz channel and MIMO transmission/reception through a 20 MHz channel. 20M STA (AP) is a terminal (access point) which can perform SISO transmission/reception through a 20 MHz channel.

Figure 8:
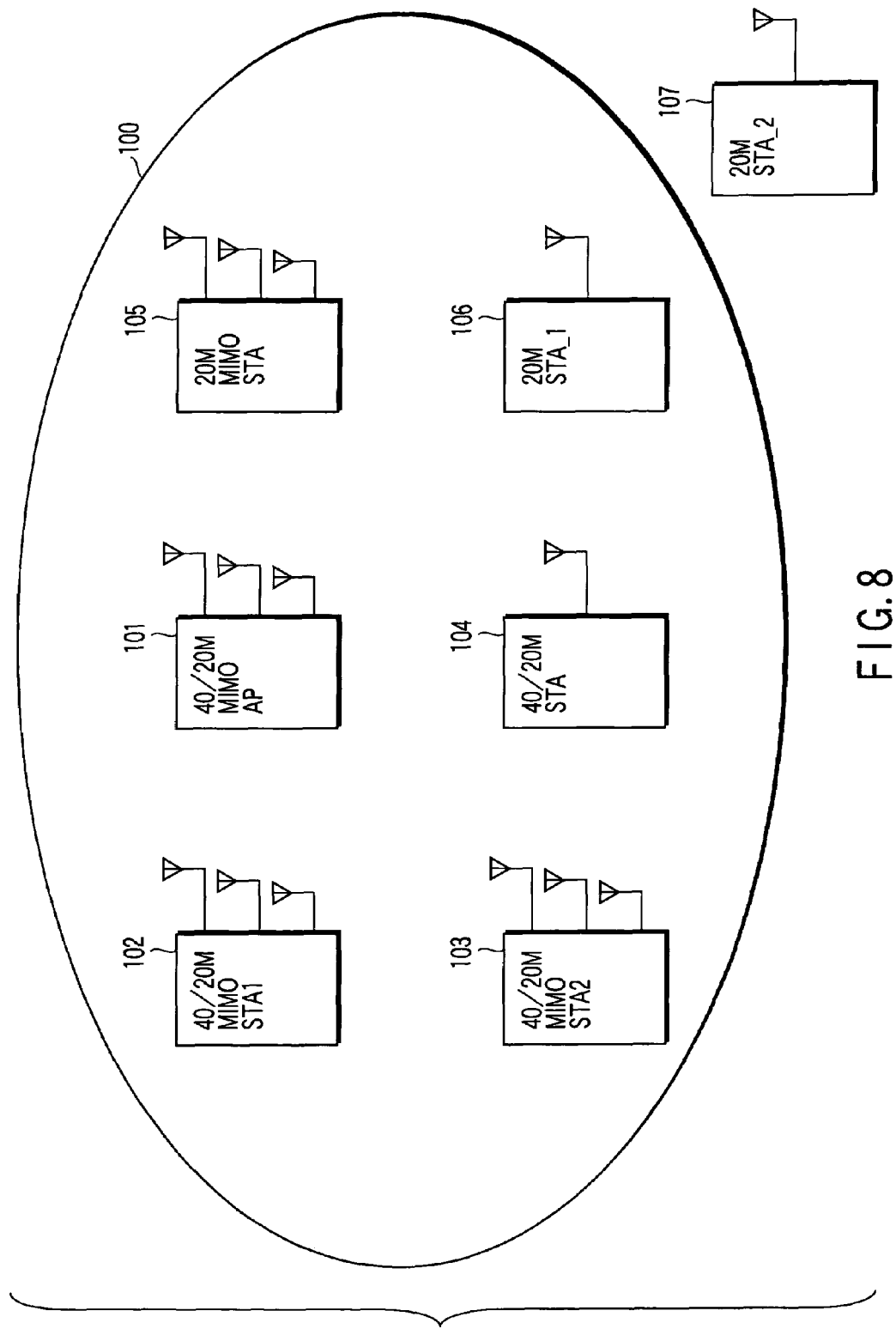
FIG. 8 is a view for explaining a network arrangement according to the fourth embodiment.

FIG. 8 shows an example of a network including the wireless communication apparatuses in FIGS. 6 and 7. A base station in the network is an access point 101 corresponding to 40M/20M MIMO AP. Each of terminals 102 to 106 has established association with the base station 101. The types of these terminals 102 to 106 are 40M/20M MIMO STA1, 40M/20M MIMO STA2, 40M/20M STA, 20M MIMO STA, and 20M STA_1. Assume that 20M STA_2 belongs to a network using, for example, 20M_ch_b.

Figure 9A:
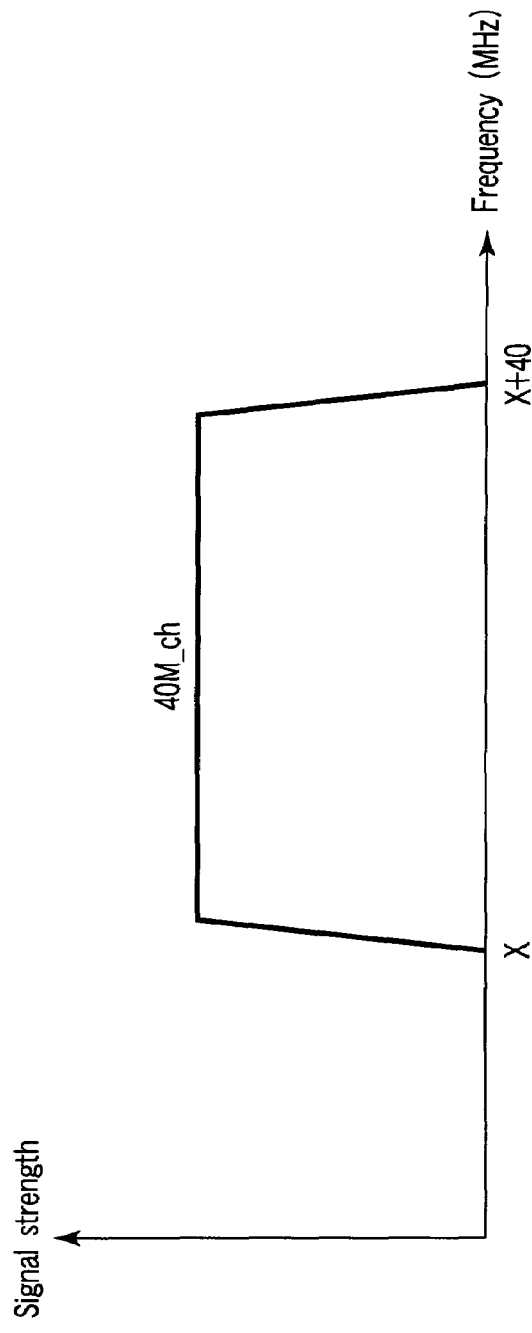
FIGS. 9A and 9B are schematic views of a channel in the network arrangement according to the fourth embodiment.
Figure 9B:
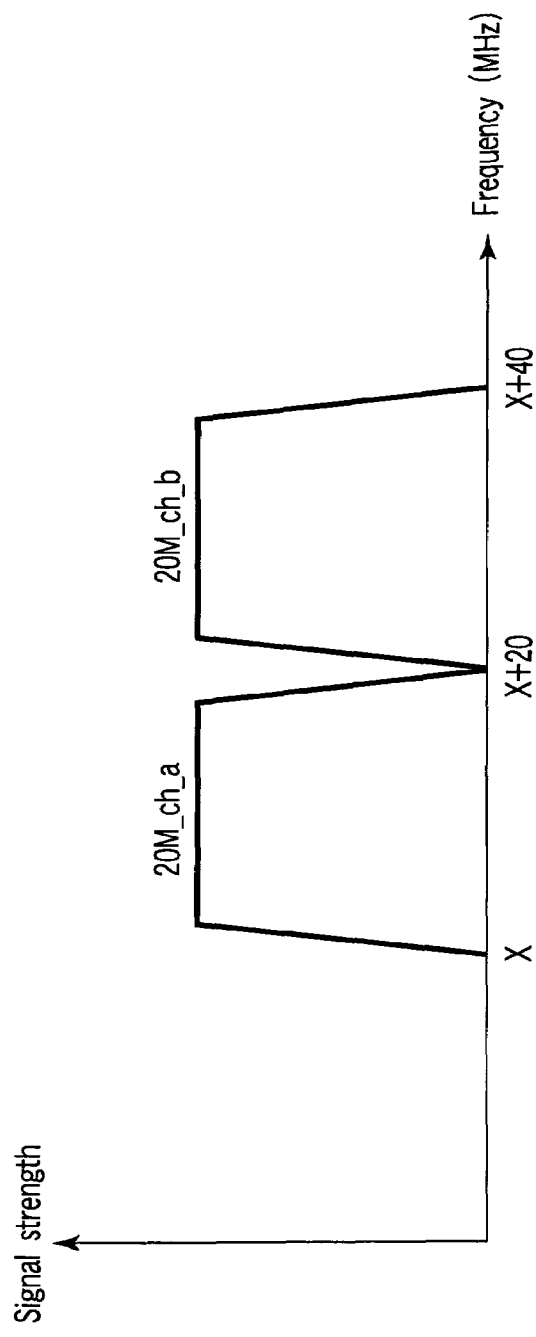

As schematically shown in FIG. 9B as a communication channel, the network in FIG. 8 has a 20 MHz channel 20M_ch_a using a frequency band from X MHz to (X+20) MHz and a 40 MHz channel 40M_ch using a frequency band from X MHz to (X+40) MHz (FIG. 9A). Therefore, the frequency band from X MHz to (X+20) MHz is redundantly used by a 20 MHz channel and 40 MHz channel. Another 20 MHz channel 20M_ch_b using the frequency band from (X+20) MHz to (X+40) MHz is not used in the network in FIG. 8, but may be used in another network.

As described above, the channels 20M_ch_a and 20M_ch_b are not simultaneously used. In the network, the 40 MHz channel 40M_ch and one of the 20 MHz channels 20M_ch_a and 20M_ch_b which overlap 40M_ch in terms of frequency are used. In other words, 40M/20M MIMO STA and 40M/20M STA belonging to the network do not simultaneously use 20M_ch_a and 20M_ch_b.

Figure 10:
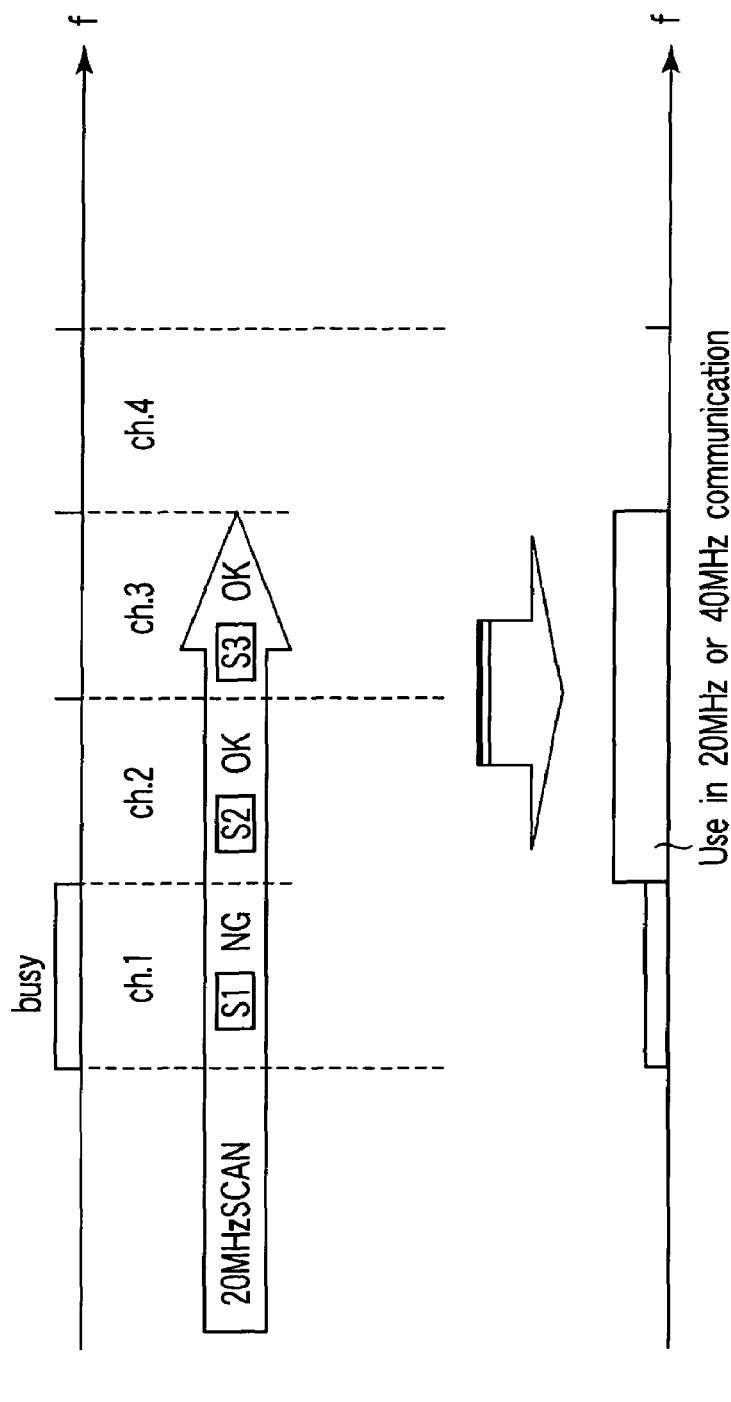
FIG. 10 is a view for explaining a channel search sequence according to the fourth embodiment.

The channel search sequence of 40M/20M AP in the above-described 20 MHz/40 MHz coexistent wireless LAN system will be described below. When 40M/20M AP searches for a frequency channel to be used in a local BSS (Basic Service Set), the following channel search sequence is executed. Basically, the channel search sequence of 40M/20M AP is the same as that in the first embodiment. The channel search sequence will be described with reference to FIG. 10.

40M/20M AP sequentially performs carrier sense from ch1 (search S1 in FIG. 10) by using the 20 MHz communication bandwidth. The result of carrier sense of ch1, ch2, and ch3 indicates that ch2 and ch3 are sequentially idle. In this case, 40M/20M AP secures both ch2 and ch3 as the communication channels used in a local BSS 100. In the local BSS 100, ch2 or ch3 is used for 20 MHz communication, and both ch2 and ch3 are used for 40 MHz communication.

In the fourth embodiment, the adjacent channels such as ch2 and ch3 are idle. However, the two channels to be secured for the local BSS by 40M/20M AP may be adjacent to or separated from each other.

Other than the above-described channel search sequence, 40M/20M AP can execute a channel search sequence similar to that in the first to third embodiments in the 20 MHz/40 MHz coexistent system as described in the fourth embodiment.

As described above, when it is found that two channels are idle during the channel search by the 20 MHz communication bandwidth in 40M/20M AP, both the two channels can be secured, assigned to the 20 MHz/40 MHz coexistent system (for the local BSS), and used. Hence, the two channels are used for 20 MHz communication and 40 MHz communication in the system in which the 40M/20M terminals are present.

As described above, according to the embodiments of the present invention, the arrangement for the channel search for the plurality of channels having different frequency bandwidths in the same frequency domain can be realized. More specifically, since the channel search can be performed for the channels having different communication bandwidths, the channels having different communication bandwidths can be secured on the basis of the channel search result. Also, in accordance with the channel search result, the channel and communication bandwidth to be used can be selected appropriately.

Furthermore, since the following channel search is controlled in accordance with the channel search result, the efficiency of the search can be improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless communication apparatus for performing wireless communication using one first-channel of two first-channels each having a first-frequency-bandwidth, and performing wireless communication using a second-channel having a second-frequency-bandwidth which is wider than the first-frequency-bandwidth, the second-channel overlapping the two first-channels, the two first-channels and the second-channel being accessed in accordance with Carrier Sense Multiple Access with Collision Avoidance (CSMA/CA) in a Basic Service Set (BSS), comprising:

a channel search device configured to execute a first channel search for an idle channel having the first-frequency-bandwidth and a second channel search for a an idle channel having the second-frequency-bandwidth, and obtain a search result indicating the idle channel having the first-frequency-bandwidth or the idle channel having the second-frequency-bandwidth; and a determination device configured to determine a channel to be used for the wireless communication using the one first-channel or the wireless communication using the second-channel, on the basis of the search result obtained by the channel search device.

2. The apparatus according to claim 1, wherein the channel search device limits a search range of bandwidth for the first channel search on the basis of the search result obtained by the second channel search.

3. The apparatus according to claim 1, wherein the second-frequency-bandwidth is an integral multiple of the bandwidth of the first frequency band.

4. The apparatus according to claim 1, further comprising a periodic signal transmitting device configured to transmit a periodic signal on the idle channel in order to keep the idle channel found by the channel search device.

5. The apparatus according to claim 1, further comprising a device configured to transmit a continuous signal on the idle channel in order to keep the idle channel found by the channel search device.

6. The apparatus according to claim 1, wherein the determination device determines that at least two idle channels each having the first-frequency-bandwidth and found by the first channel search are used as at least one said second-channel.

7. The apparatus according to claim 6, wherein said at least two idle channels have adjacent frequency bandwidths.

8. A wireless communication method for performing wireless communication using one first-channel of two first-channels each having a first-frequency-bandwidth, and performing wireless communication using a second-channel having a second-frequency-bandwidth which is wider than the first-frequency-bandwidth, the second-channel overlapping the two first-channels, the two first-channels and the second-channel being accessed in accordance with Carrier Sense Multiple Access with Collision Avoidance (CSMA/CA) in a Basic Service Set (BSS) comprising:

executing a first channel search for a an idle channel having of the first frequency bandwidth and a second channel search for a an idle channel having of the second frequency bandwidth, and obtaining a search result indicating the idle channel having the first-frequency-bandwidth or the idle channel having the second-frequency-bandwidth; and determining a channel to be used for the wireless communication using the one first-channel or the wireless communication using the second-channel, on the basis of the obtained search result.

9. The method according to claim 8, further comprising: limiting a search range of bandwidth for the first channel search on the basis of the search result obtained by the second channel search.

10. The method according to claim 8, wherein the second-frequeney-bandwidth is an integral multiple of the bandwidth of the first frequency band.

11. The method according to claim 8, further comprising: transmitting a periodic signal on the idle channel in order to keep the idle channel.

12. The method according to claim 8, further comprising: transmitting a continuous signal on the idle channel in order to keep the idle channel.

13. The method according to claim 8, wherein said determining includes using at least two idle channels each having the first-frequency-bandwidth and found by the first channel search as at least one said second channel.

14. The method according to claim 13, wherein said at least two idle channels have adjacent frequency bandwidths.

* * * * *